(12) United States Patent
Carr et al.

(10) Patent No.: US 6,505,124 B2
(45) Date of Patent: Jan. 7, 2003

(54) GPS SYSTEM TO PROVIDE PLANTER TRIPPING FOR CROP RESEARCH PLOTS

(75) Inventors: Brian W. Carr, Nevada, IA (US);
Peter B. Moore, Ames, IA (US);
Donald F. Handorf, Ames, IA (US);
Timothy A. Schroeder, Ames, IA (US)

(73) Assignee: Gary W. Clem, Inc., Nevada, IA (US)

( * ) Notice: Subject to any disclaimer, the term of this patent is extended or adjusted under 35 U.S.C. 154(b) by 78 days.

(21) Appl. No.: 09/728,963

(22) Filed: Dec. 4, 2000

(65) Prior Publication Data

US 2001/0000806 A1 May 3, 2001

Related U.S. Application Data

(63) Continuation-in-part of application No. 09/430,973, filed on Nov. 1, 1999, now abandoned.
(60) Provisional application No. 60/169,067, filed on Dec. 6, 1999.

(51) Int. Cl.$^7$ ................................................ G06F 19/00
(52) U.S. Cl. ................................................ 702/5; 702/2
(58) Field of Search ........................... 702/5, 2; 701/50

(56) References Cited

U.S. PATENT DOCUMENTS

| 5,334,987 | A |   | 8/1994  | Teach            |        |
|-----------|---|---|---------|------------------|--------|
| 5,664,402 | A |   | 9/1997  | Sandvik et al.   |        |
| 5,704,546 | A |   | 1/1998  | Henderson et al. |        |
| 5,757,315 | A |   | 5/1998  | Aoki             |        |
| 5,899,956 | A |   | 5/1999  | Chan             |        |
| 5,902,343 | A |   | 5/1999  | Hale et al.      |        |
| 5,913,915 | A | * | 6/1999  | McQuinn          | 701/50 |
| 6,088,644 | A | * | 7/2000  | Brandt et al.    | 701/50 |
| 6,112,143 | A | * | 8/2000  | Allen et al.     | 701/25 |
| 6,141,614 | A | * | 10/2000 | Janzen et al.    | 172/2  |
| 6,199,000 | B1 | * | 3/2001 | Keller et al.    | 701/50 |

* cited by examiner

Primary Examiner—Donald E. McElheny, Jr.

(57) ABSTRACT

A GPS system to provide planter tripping for crop research plots provides the longitude and latitude of the first trip location and provide a continuous flow of location information. A control computer calculates the next tripping location and provides a signal to the planter at that location and each subsequent tripping location in the field grid. A GPS receiver mounted on the planter provides location information. When the first plot is manually tripped the computer will use vector information to determine the next tripping location. The computer has a program that allows entry of planted length and alley width so the system can calculate the next plot location from the original planter trip. Additional parameters entered in the program include the number of trips needed to pass across the field and the number of passes that would be needed to complete the planting grid.

10 Claims, 3 Drawing Sheets

GPS SYSTEM TO PROVIDE PLANTER TRIPPING FOR CROP RESEARCH PLOTS

CROSS REFERENCE TO RELATED APPLICATIONS

This application claims the benefit of U.S. Provisional Patent Application Serial No. 60/169,067 filed Dec. 6, 1999 and is a Continuation-In-Part of Serial No. 09/430,973 filed Nov. 1, 1999, now abandoned.

BACKGROUND OF THE INVENTION

Most research plots are planted with a check cable system presently. This cable is stretched across the field prior to planting. Some type of indicator is mounted on the cable at specified intervals that are then detected by the planter. This signal starts the planting process and locates the plot. This cable is heavy and cumbersome to move across the field with each pass of the planter. Cables are hard to use because of crop residue from the prior year.

It is therefore a principal object of this invention to use a GPS in conjunction with the planting process to provide planter tripping for crop research plots.

SUMMARY OF THE INVENTION

A GPS receiver will provide the longitude and latitude of the first trip location and provide a continuous flow of location information. A control computer will calculate the next tripping location and provide a signal to the planter at that location and each subsequent tripping location in the field grid.

The GPS receiver will be mounted on the planter to provide location information. When the first plot is manually tripped the computer will use vector information and determine the next tripping location. The computer has a program that allows entry of planted length and alley width so the system can calculate the next plot location from the original planter trip. Additional parameters entered in the program include the number of trips needed to pass across the field and the number of passes that would be needed to complete the planting grid.

DESCRIPTION OF THE PREFERRED EMBODIMENT

Figure 1:
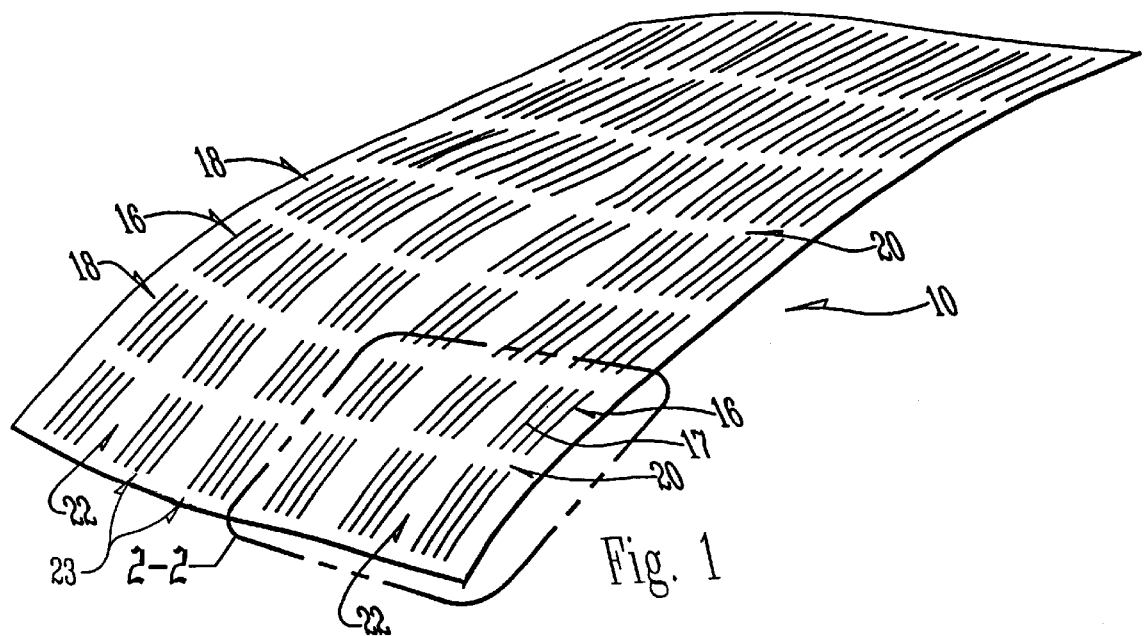
FIG. 1 is a perspective view of a research field for row crops.
Figure 2:
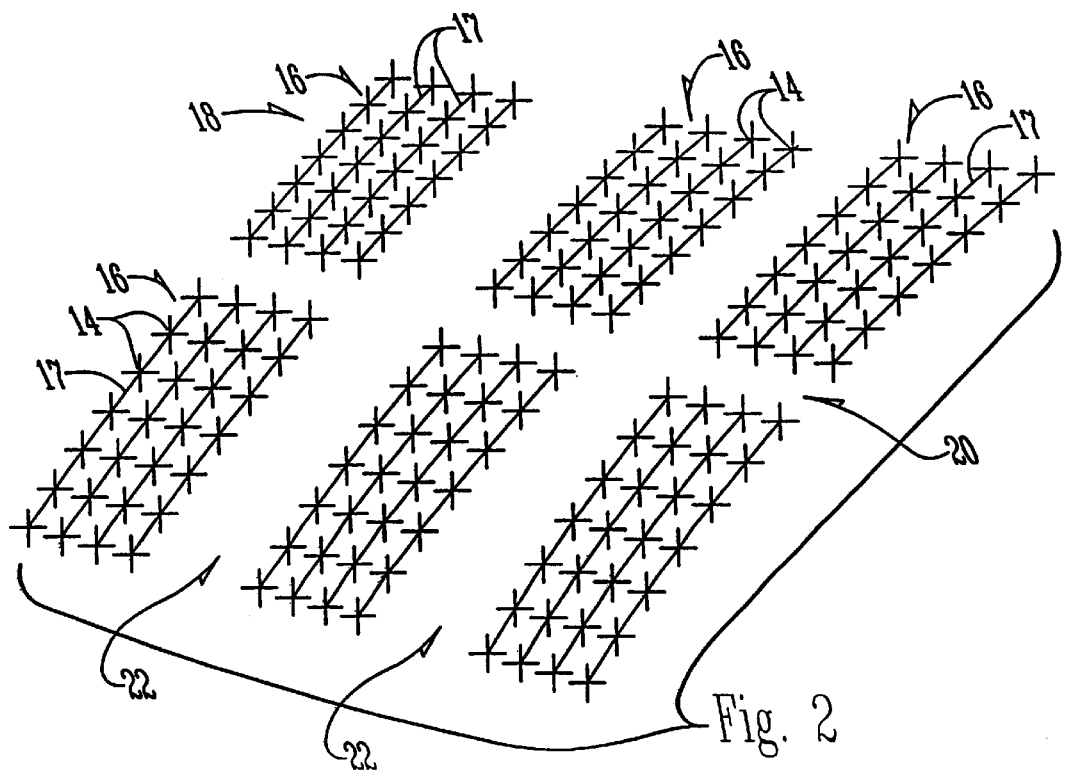
FIG. 2 is an enlarged scale perspective view of the area outlined in lines 2—2 of FIG. 1.
Figure 3:
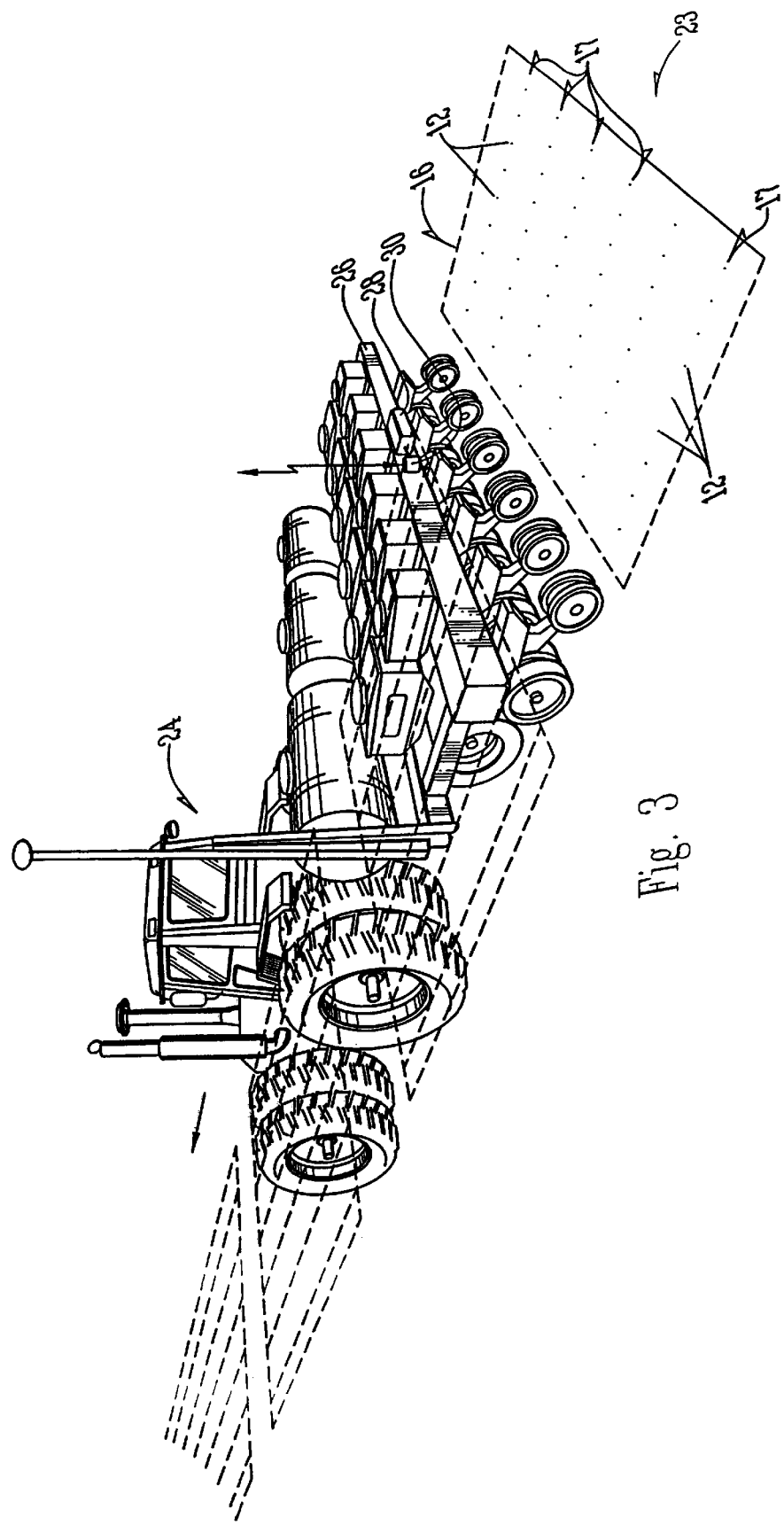
FIG. 3 is an enlarged scale perspective view of a planter used to plant the field in FIG. 2.

The numeral 10 designates a research field in which row crop seeds are planted for research purposes. The planting locations of each seed planted is designated by the numeral 12, and the plants resulting from the subsequent germination of the seeds are designated by the numerals 14.

The field 10 is divided into a plurality of plots 16 which are comprised of a plurality of parallel rows 17. The plots are located in a series of parallel ranges 18 which are separated by laterally extending alleys 20 (geometrically in an "x" direction) and a series of longitudinal alleys 22 (geometrically in a "y" direction). Alleys 20 and 22 are typically at right angles to each other. The numerals 23 represent separate tiers of plots that are created by each pass of the planter through the field.

When the field 10 is planted, a conventional farm tractor 24 and a research planter 26 are used. Separate packets of seed are typically planted in each row 17 in each plot 16. The planter 26 includes a computer 28 which is operatively connected by conventional means to a GPS receiver 30 so that as each seed is deposited in the soil of a row, a global position of the planted seed is instantaneously determined.

The GPS receiver 30 will identify the longitude and latitude of the first path trip locations and will provide a continuous flow of seed planter tripping location information. The computer 29 will calculate the next tripping locations on the return path and will provide a signal to the planter 26 at that location and each subsequent tripping location in the field grid.

The research planter 26 can have a sensor (not shown), e.g. a photocell, to monitor the dropping of each seed whereupon a signal is transmitted to the computer 28 or GPS 30 to trigger a location reading to be stored in the memory of the computer. More specifically, when the first plot is manually tripped, the computer 28 uses vector information and determines the next tripping location. The computer 28 uses vector information and determines the next tripping location. The computer 28 has a program that allows entry of data as to the row length and alley width so that the system can calculate the net plot location from the original planter trip. An additional parameter is entered into the program to include the number of trips needed to make a pass across the field and the number of passes that would be needed to complete the planting grid. This system maintains accuracy to around 2 inches. Systems other than GPS could be used to attain this information. Examples would be radio, sonar or laser. Longitude and latitude on earth are not full needed for this function. Displacement or distance from the original location is what will drive the tripping.

Figure 4:
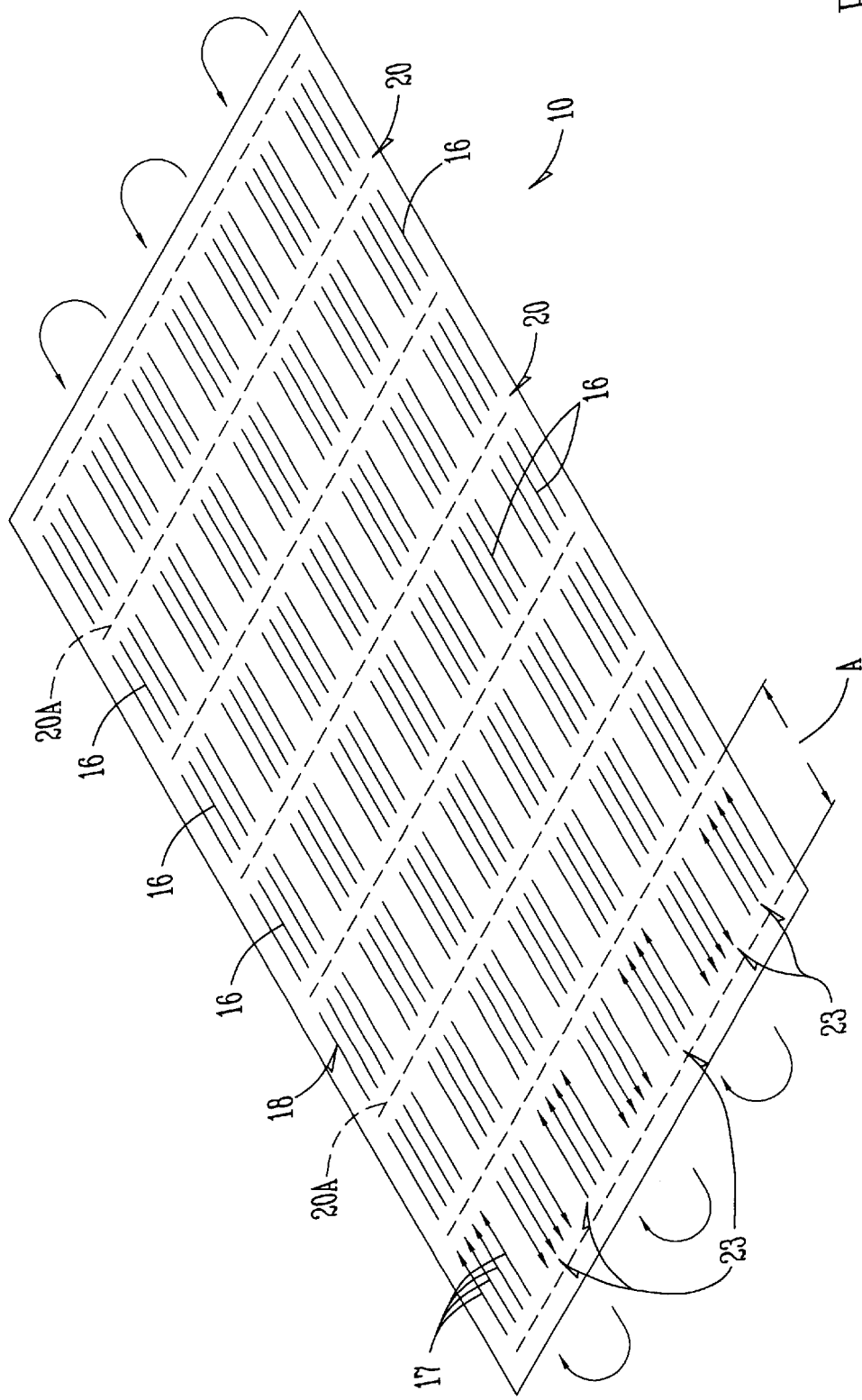
FIG. 4 is a perspective view of a research field similar to FIG. 1 using the vector system of this invention.

The GPS receiver 30 will be mounted on the planter 26 to provide location information. When the first plot is manually tripped the computer 28 will use vector information and determine the next tripping location. The vector lengths A (FIG. 4) are the distance between the center lines 20A of alleys 20.

After the original pass of the planter 26 through the field to plant a first tier of plots 23, the planter 26 is then reversed in direction to plant additional tiers of plots 23 parallel to the first tier 23 with the computer 28 triggering the deposit of seeds from data provided by the GPS receiver 30.

It is therefore seen that this invention will eliminate the use of cables to trigger the planter, and will provide an efficient and effective method of planting seed research fields.

What is claimed is:

1. A method of planting field seeds in a test plot field comprising a plurality of plots with a plurality of parallel seed rows wherein a plurality of plots are separated into parallel ranges comprised of a plurality of side by side plots, with the ranges being separated by parallel alleys extending at right angles to the seed rows, comprising, using a multi-row planter capable of simultaneously planting field seeds in a plurality of parallel rows, positioning the planter in a corner of a substantially rectangular field to be planted and heading the planter in a direction to plant a plurality of plots in a longitudinal direction along one side of the field, placing a GPS device on the planter and operatively connecting the same to a computer, predetermining the length of a longitudinal vector comprising the distance between centerlines of two adjacent alleys, providing a trigger mechanism on the planter to deposit field seeds in the soil of the field in the location of each of the rows, and to withhold the deposit of seeds in the alleys, taking a GPS reading on an end point of beginning on the end of a first set of vectors extending along the rows in a first plot, moving the planter longitudinally through the field in the direction of the rows to plant the first tier of plots, continuously gathering GPS data from the GPS device and feeding the same to the computer while the first plot is being planted, and causing the computer to automatically and intermittently cause the planter to plant seed and to stop planting seed as the planter progresses longitudinally through the field as the GPS data advises the computer that the planter has traveled a predetermined distance, with the GPS device providing data to the computer both as to the distance and the direction traveled by the planter, so that seeds will be planted in the rows of the plots of the first tier of plots without planting seeds in the alleys between those plots, and sequentially moving the planter longitudinally through the field to similarly plant additional tiers of plots parallel to the first tier of plots.

2. A method for triggering a seed planter to establish a plurality of field seed test plots, comprising, positioning the seed planter at a corner of the area to be planted, establishing the position of the planter when the planter is tripped to start or stop planting seeds for precision location operatively associated with the planter, recording the initial position of the planter and establishing the position of the planter when the planter is tripped to start or stop planting seeds for data recording operatively connected to the precision location means, moving the planter in an initial path across a field that is to be planted, manually switching the planter on to deposit seeds, manually switching the planter off to stop depositing seeds, manually repeating switching the planter both on and off while the planter is moving along an initial path across the field, manually reversing the direction of the planter such that the planter faces in the direction opposite to the initial path across the field, positioning for the return path such that the planter is disposed so that the edge of the first path is contiguous to the edge of the return path, automatically calculating locations for the planter to start or stop planting seeds, manually moving the planter across the field on the return path, automatically tripping the planter to start depositing seeds such that as the planter passes contiguous to a planted area the seed planter is switched on, automatically tripping the planter to stop depositing seeds such that as the planter passes contiguous to an area where no seeds were planted the planter is switched off, and whereby on each consecutive pass across the field a pattern is created of plots with planted seeds and intervening alleys with no seeds.

3. A method for triggering a seed planter to establish a plurality of field seed test plots, comprising, positioning the seed planter at a corner of the area to be planted, establishing the position of the planter when the planter is tripped to start or stop planting seeds, recording the initial position of the planter and establishing the position of the planter when the planter is tripped to start or stop planting seeds, moving the planter across a field that is to be planted, switching the planter on or off to deposit or stop depositing seeds, reversing the direction of the planter such that the planter faces in the direction opposite to the initial path across the field such that the planter is disposed to a return path so that the edge of the first path is contiguous to the edge of the return path, calculating start locations and stop locations for the planter to start or stop planting seeds, moving the planter across the field on the return path, automatically tripping the planter to start planting seeds such that as the planter passes contiguous to an area planted on the previous path the seed planter is switched on, automatically tripping the planter to stop planting seeds such that as the planter passes contiguous to an area where no seeds were planted on the previous path the planter is switched off, and whereby on each consecutive pass across the field a pattern is created of plots with planted seeds and intervening alleys with no seeds.

4. The method in claim 3, wherein the location of said planter is established via a precision location means for precision location operatively associated with the planter.

5. The method in claim 4, wherein the precision location means utilizes signals is selected from the group consisting of GPS, radio, microwave, sonar, radar and laser.

6. The method in claim 3, wherein the location of said planter is established via a precision location device operatively associated with the planter.

7. The method in claim 3, wherein the position of said planter is recorded via a data recording means operatively connected to the precision location means.

8. The method in claim 3, wherein said planter is tripped to start or stop planting seeds while the planter is moving across the field.

9. The method of claim 3, wherein the start or stop planting seed locations of the planter are calculated.

10. The method of claim 3, wherein said planter is tripped to start or stop planting seed for automatically controlling the seed planter operatively connected to the computation means.

* * * * *